United States Patent
Pepper, Jr.

[11] 3,903,785
[45] Sept. 9, 1975

[54] ROCK CLIMBING ANCHOR

[76] Inventor: William Pepper, Jr., 9839 Singleton Dr., Bethesda, Md. 20034

[22] Filed: June 24, 1974

[21] Appl. No.: 482,158

[52] U.S. Cl. .................................. 85/79; 24/136 B
[51] Int. Cl.² ................................................ F16B 2/14
[58] Field of Search .............. 254/135 R, 191, 104; 24/136 R, 126, 136 K, 136 B; 294/78 R, 74 R; 85/79, 67

[56] References Cited
UNITED STATES PATENTS

| | | | |
|---|---|---|---|
| 1,071,868 | 9/1913 | Blackburn | 24/136 K |
| 2,004,480 | 6/1935 | Pleister et al. | 85/79 |
| 2,946,619 | 7/1960 | Wahl | 294/74 |
| 3,472,120 | 10/1969 | Taylor | 85/79 |
| 3,478,641 | 11/1969 | Dohmeier | 85/79 |
| 3,724,035 | 4/1973 | Smith | 294/74 |
| 3,766,610 | 10/1973 | Thorsbakken | 24/136 |

FOREIGN PATENTS OR APPLICATIONS
2,372,754   4/1945   Canada .......................... 24/136 K

*Primary Examiner*—Frank E. Werner
*Assistant Examiner*—Kenneth Noland

[57] ABSTRACT

An anchor comprises a sliding wedge, two coacting outer parts which are forced apart by the wedge, and a loop of cable that transmits the load to the wedge. The cable passes through all three parts. The outer parts have mating flanges that keep them parallel to each other. The climber places the anchor in a crack in the rock and expands it by pulling on the cable loop. In one embodiment of the invention, an opening between the outer parts allows insertion of a tool to dislodge the wedge so the anchor can be removed; in another embodiment an extension of the wedge protrudes through this opening to obviate the need for a tool.

7 Claims, 5 Drawing Figures

ROCK CLIMBING ANCHOR

BACKGROUND OF THE INVENTION

This invention relates generally to anchoring devices, and more specifically to self-wedging, removable rock anchors for use in the sports of rock climbing and mountaineering.

There is a need in climbing for an anchoring device that gives security of anchoring similar to that provided by pitons and at the same time gives the convenience of use and freedom from damage to the rock provided by climbing nuts. No device in common use combines these features, and the rock anchors used in the mining industry are unsuitable for various reasons relating to the differences in requirements between the two fields.

SUMMARY OF THE INVENTION

My invention provides the needed combination of secure anchoring, convenience of use, and freedom from damage to the rock by the following combination of features: (1) a self-wedging action in which a sliding wedge coacting with two outer parts expands the anchor within a natural crack in the rock when a load is applied to the anchor; (2) positive wedging even when the load is removed so the anchor will remain in place; (3) a shape that fits into irregularities in the crack and also prevents rotation of the anchor around the load axis when wedged in a crack; (4) a means of dislodging the sliding wedge when the anchor is expanded so the climber can remove it from the crack; (5) all parts retained on a loop of cable; and (6) the cable threaded through the parts in such a way that the wedge cannot be pulled out of the assembled anchor by a load on the cable.

DESCRIPTION OF THE PREFERRED EMBODIMENT

Figure 1:
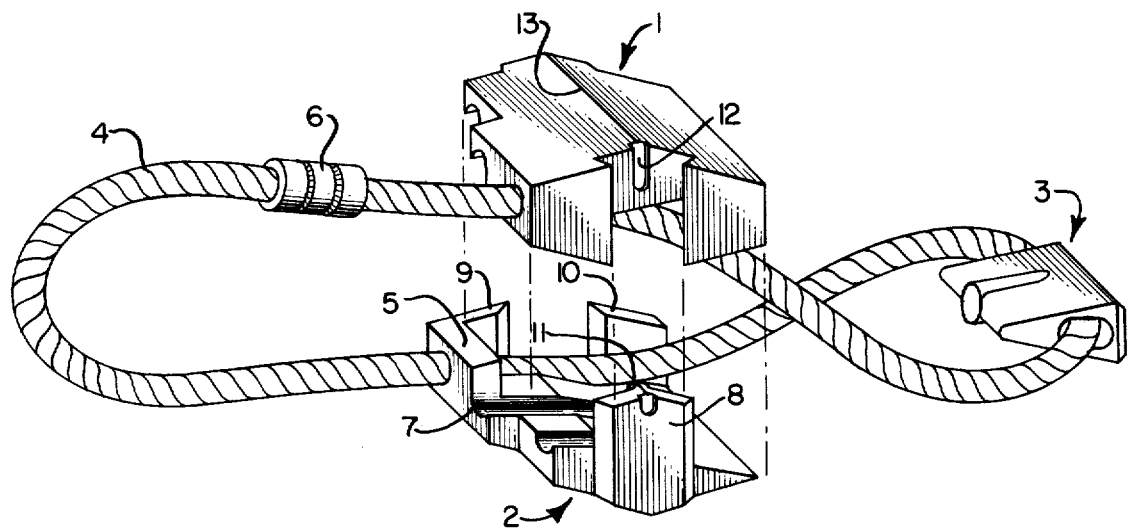
FIG. 1 is an exploded perspective view of one form of my anchor.
Figure 2:
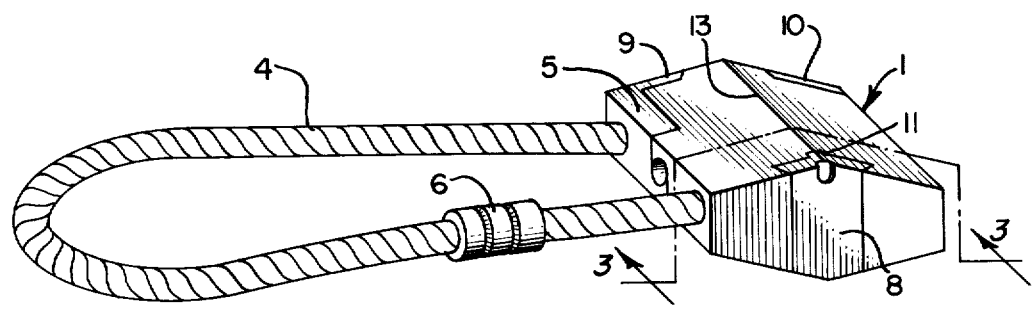
FIG. 2 is a perspective view of the assembled anchor of FIG. 1.

In FIG. 1, 1 and 2 are identical outer parts with mating surfaces that coact with the inner wedge-shaped expander 3 to expand the anchor when a load is applied to the cable 4. The outer parts and the expander are cast of aluminum alloy. The tangent of one-half the included angle between the inclined surfaces of the wedge is less than the coefficient of friction for the materials of the mating surfaces so that the wedge cannot be dislodged by pressure on the outer parts. Each outer part has a bulkhead 5 to limit the travel of the wedge-shaped expander. The cable passes through an opening in each bulkhead 5 and also passes through an opening in expander 3, and the ends of the cable are joined by a crimped sleeve 6 or other means to form a continuous loop retaining all the parts in such a way that a load applied to the anchor cannot pull the expander out from between the two outer parts. A groove 7 in each outer part, running parallel to and midway between the openings provided for the cable, combines with the corresponding groove in the other outer part to form an opening in the assembled anchor to permit entry of a rod-shaped tool to dislodge the expander and make it possible to remove the anchor after it has been wedged in a crack. Flanges 8, 9, and 10 dovetail with the corresponding flanges on the other outer part to form sidewalls and maintain alignment of the two outer parts parallel with each other. A small protrusion 11 on the inside of flange 8, which is formed with a punch after assembly of the anchor but could instead be a pin or screw, slides up and down in groove 12 of the other outer part and limits the travel of the two outer parts away from each other when it hits the bottom of the groove. A raised edge 13, which could also take the form of one or more points or teeth, is provided on each outer part to engage local irregularities in the rock and give the anchor a secure purchase on the rock when wedged into these irregularities.

FIG. 2 shows the assembled anchor in the same perspective as FIG. 1.

Figure 3:
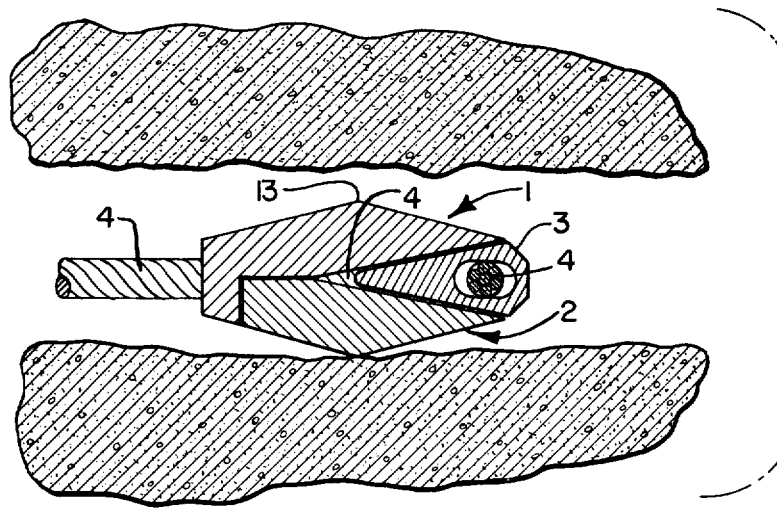
FIG. 3 is a sectional view, taken along plane A of FIG. 2, of the assembled anchor as inserted in a crack in the rock.

FIG. 3 is a sectional view along plane A of the assembled anchor of FIG. 2 showing the relationship of the parts with minimum expansion of the anchor. The climber can insert the anchor with one hand into a crack in the rock and move it to a location such as that shown in FIG. 3 where the crack widens locally. By extending one finger against the anchor while pulling the cable with the other fingers of that hand, the climber can cause the anchor to expand, wedging itself in place.

Figure 4:
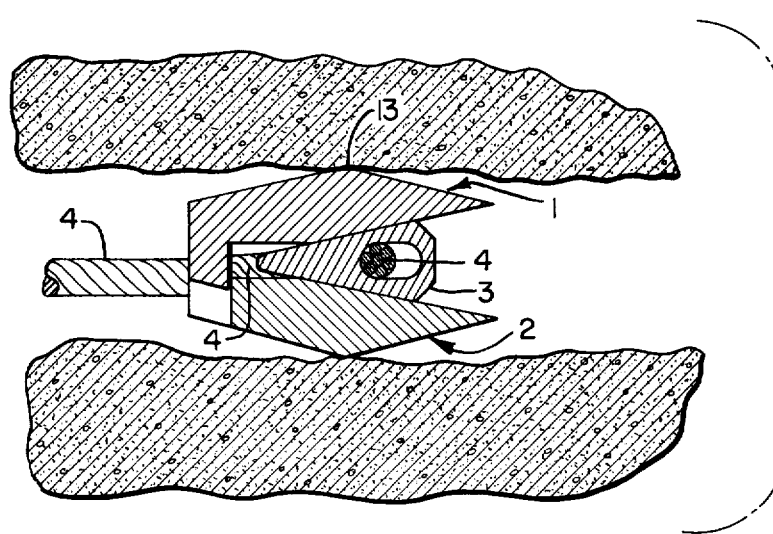
FIG. 4 is a sectional view, taken along plane A of FIG. 2, of the assembled anchor expanded and wedged into place in the crack.

FIG. 4 is a sectional view along plane A of the assembled anchor of FIG. 2 showing the expanded anchor wedged in place. Once the anchor is placed, the climber can test its placement and simultaneously wedge it tighter by taking the loop of cable in his hand and giving it a hard pull. A special advantage of this invention over pitons or climbing nuts is that a heavy load on the anchor, such as might be caused by a climber falling, wedges the anchor even more securely in place instead of tending to dislodge it.

Figure 5:
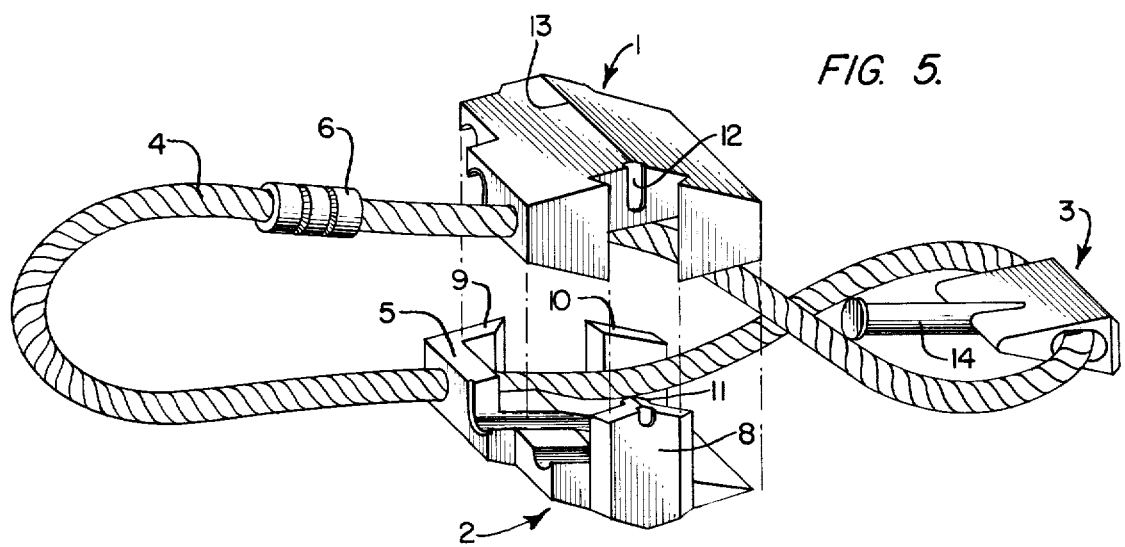
FIG. 5 is an exploded perspective view of another embodiment of my invention with a forward extension of the sliding wedge for dislodging the wedge when the anchor is expanded.

FIG. 5 is an exploded perspective view of another form of my invention in which the various parts and their functions correspond to those shown in FIG. 1 except that an extension 14 of the inner wedge-shaped expander protrudes through an opening in the assembled anchor for convenience in dislodging the expander. An enlargement at the end of this extension 14 prevents the expander from falling out of the anchor.

What I claim as new and desire to secure by Letters Patent is:

1. A rock anchor consisting of an inner wedge-shaped expander, two separate outer parts each having an inclined surface for mating cooperation with said expander therebetween, and a cable that transmits the load to said expander, said expander and outer parts being retained and carried by said cable.

2. A rock anchor as described in claim 1 with said expander and outer parts retained on said cable in such a way that the expander cannot be pulled out from between the outer parts by a load on the cable.

3. A rock anchor consisting of an inner wedge-shaped expander, two separate outer parts each having an inclined surface for mating cooperation with said expander therebetween, and a cable that transmits the load to said expander, said expander and outer parts being retained and carried by said cable, an aperture in the front of the assembled anchor to allow insertion of a tool to dislodge said expander and permit removal of the anchor.

4. A rock anchor consisting of an inner wedge-shaped expander, two separate outer parts each having an inclined surface for mating cooperation with said expander therebetween, and a cable that transmits the load to said expander, said expander and outer parts being retained and carried by said cable with an extension of said expander protruding in the front of the assembled anchor to provide a means for dislodging the expander to remove the anchor.

5. A rock anchor consisting of an inner wedge-shaped expander, a cable that transmits the load to said expander, and two separate outer parts each having an inclined surface for mating cooperation with said expander therebetween, said expander and outer parts being retained and carried by said cable said outer parts each being provided with protrusions extending substantially perpendicular to the plane bisecting the angle between said inclined surfaces of said two outer parts, said protrusions mating with the protrusions on the other outer part so as to maintain alignment of the outer parts parallel to the direction of movement taken by said expander in expanding the rock anchor.

6. A rock anchor as described in claim 5, with said protrusions on one of said outer parts dovetailing with said protrusions on the other outer part so as to maintain alignment of the outer parts parallel to each other.

7. A rock anchor as described in claim 5, said outer parts also being provided with stops to limit their travel away from each other.

* * * * *